US008182237B2

(12) United States Patent
Geremia

(10) Patent No.: US 8,182,237 B2
(45) Date of Patent: May 22, 2012

(54) ROTARY SYSTEM FOR SUBMERGED PUMPS

(75) Inventor: Silvino Geremia, Sao Leopoldo (BR)

(73) Assignee: Higra Industrial S.A., City of Sao Leopoldo (BR)

( * ) Notice: Subject to any disclaimer, the term of this patent is extended or adjusted under 35 U.S.C. 154(b) by 1107 days.

(21) Appl. No.: 11/899,491

(22) Filed: Sep. 6, 2007

(65) Prior Publication Data

US 2008/0124230 A1 May 29, 2008

(30) Foreign Application Priority Data

Sep. 25, 2006 (BR) ..................................... 0604125

(51) Int. Cl.
*F04B 53/00* (2006.01)
*F24F 3/14* (2006.01)
*B01D 47/02* (2006.01)

(52) U.S. Cl. ............ 417/61; 261/91; 261/93; 261/121.1

(58) Field of Classification Search .................... 417/61; 261/91–93, 120, 121.1
See application file for complete search history.

(56) References Cited

U.S. PATENT DOCUMENTS

| | | | | |
|---|---|---|---|---|
| 3,911,065 | A * | 10/1975 | Martin et al. | 261/91 |
| 4,431,597 | A * | 2/1984 | Cramer et al. | 261/93 |
| 4,764,313 | A * | 8/1988 | Cameron et al. | 261/35 |
| 6,070,734 | A * | 6/2000 | Hunt et al. | 209/169 |
| 6,241,221 | B1 * | 6/2001 | Wegner et al. | 261/93 |
| 6,755,623 | B2 * | 6/2004 | Thiriez | 417/61 |

* cited by examiner

*Primary Examiner* — Charles Freay
(74) *Attorney, Agent, or Firm* — Thomas, Kayden, Horstemeyer & Risley, LLP

(57) ABSTRACT

ROTARY SYSTEM FOR SUBMERGED PUMPS. The rotary system (2), object of the present invention, is composed of a motoreducer assembly, which is coupled to a rotating shaft (5), through a pulley transmission system. At the lower part of the rotating shaft (5) the submerged pump (1) will be set.

2 Claims, 5 Drawing Sheets

ROTARY SYSTEM FOR SUBMERGED PUMPS

FIELD OF THE INVENTION

The present patent application deals with a system of floaters with rotary support for submerged pumps.

HISTORY

Conventional submerged aerators and mixers, as they are also called submerged pumps, oxygenate liquids in a single direction and orientation, this way, they have a zone of action limited by the equipment's position of installation, where the referred zone of action is similar to a cone. It is in this zone where the largest to concentration of oxygenation lies. As a consequence, in the vicinities of the submerged pump there will be incorporation zones of low oxygen mixture creating dead zones. Having in view this unidirectionality, there will be the need for an implementation of a greater number of equipments used in the treatment of effluents.

The current aerators and mixers need a well-planned installation layout so that the largest zone of action possible may occur.

This way the aerators and mixers currently available in the market do not permit a rotation of the previously mentioned flow orientation or zone of action. Now, the oxygenation index directly depends on the amount of time in which the air bubbles formed in the mixture stay in contact with the liquid under treatment and on the largest zone of action possible.

SUMMARY OF THE INVENTION

The patent presented here intends to solve the current problems of the state of the technique, by proposing a rotary system for a submerged pump to oxygenate and mix liquids, said submerged pump, including an electric motor and a propeller, being rotated about a vertical shaft by a motoreducer assembly, increasing the aeration zone of action.

BRIEF DESCRIPTION OF THE DRAWINGS

The invention will be better understood with the aid of the figures that accompany the present description, where.

DETAILED DESCRIPTION OF THE INVENTION

The rotary system for a submerged pump 1, object of the present invention, comprise a flotation assembly structured to float on a body of water and a vertical shaft 5 having an upper end and a lower end, said upper end being disposed above the flotation assembly and said lower end disposed below the flotation assembly, in a submerged position. A submerged pump 1, including an electric motor and a propeller, is connected to the lower end of the vertical shaft 5, such that a longitudinal axis of the submerged pump 1 is orthogonal to the vertical shaft 5. A motoreducer assembly 2, including a drive motor, is connected to the upper end of the vertical shaft 5. The submerged pump 1 produces a conical current of liquid 7 in a position substantially horizontal. The motoreducer assembly 2 produces a rotation of the vertical shaft 5. Consequently, the submerged pump 1 and the conical current of liquid 7 are rotated about the vertical shaft 5.

Figure 1:
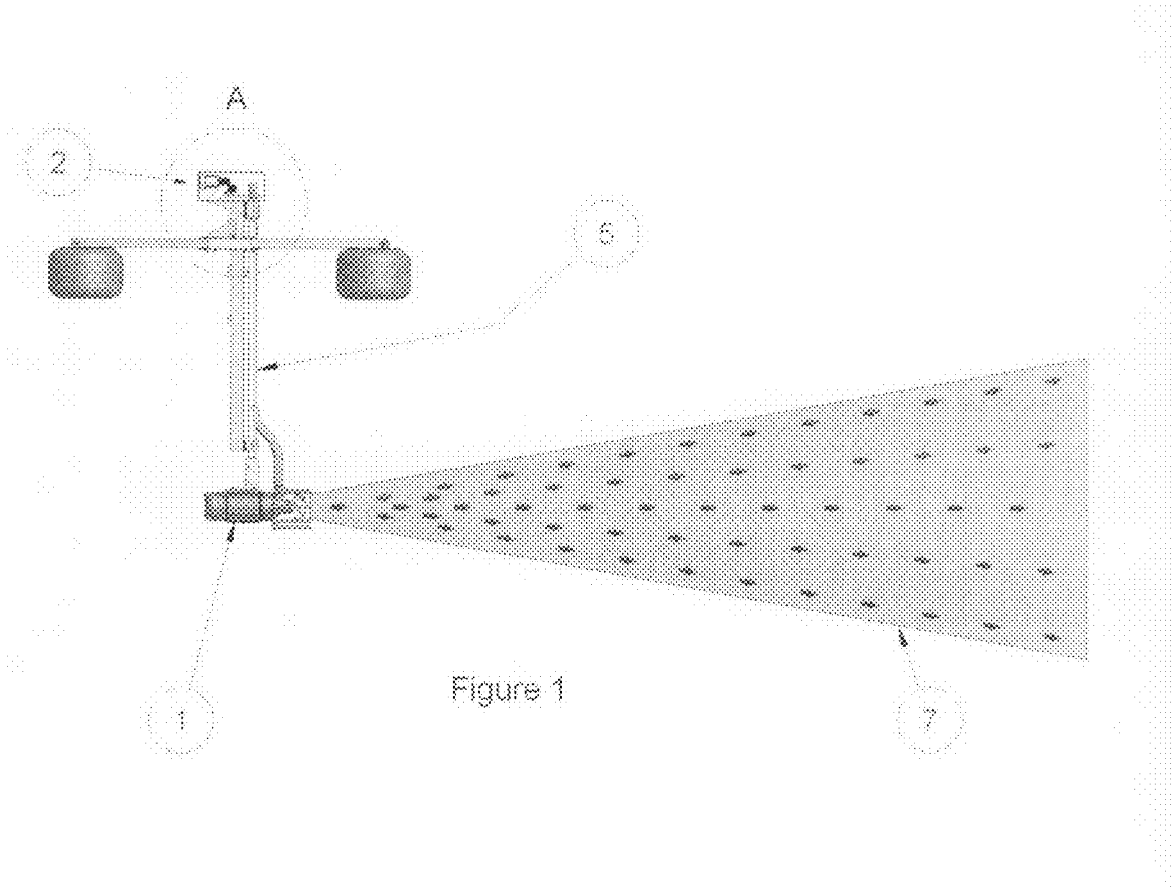
FIG. 1 is a side view of the submerged pump 1 where we can observe the location of the vertical shaft 5 and the conical current of liquid 7.
Figure 2:
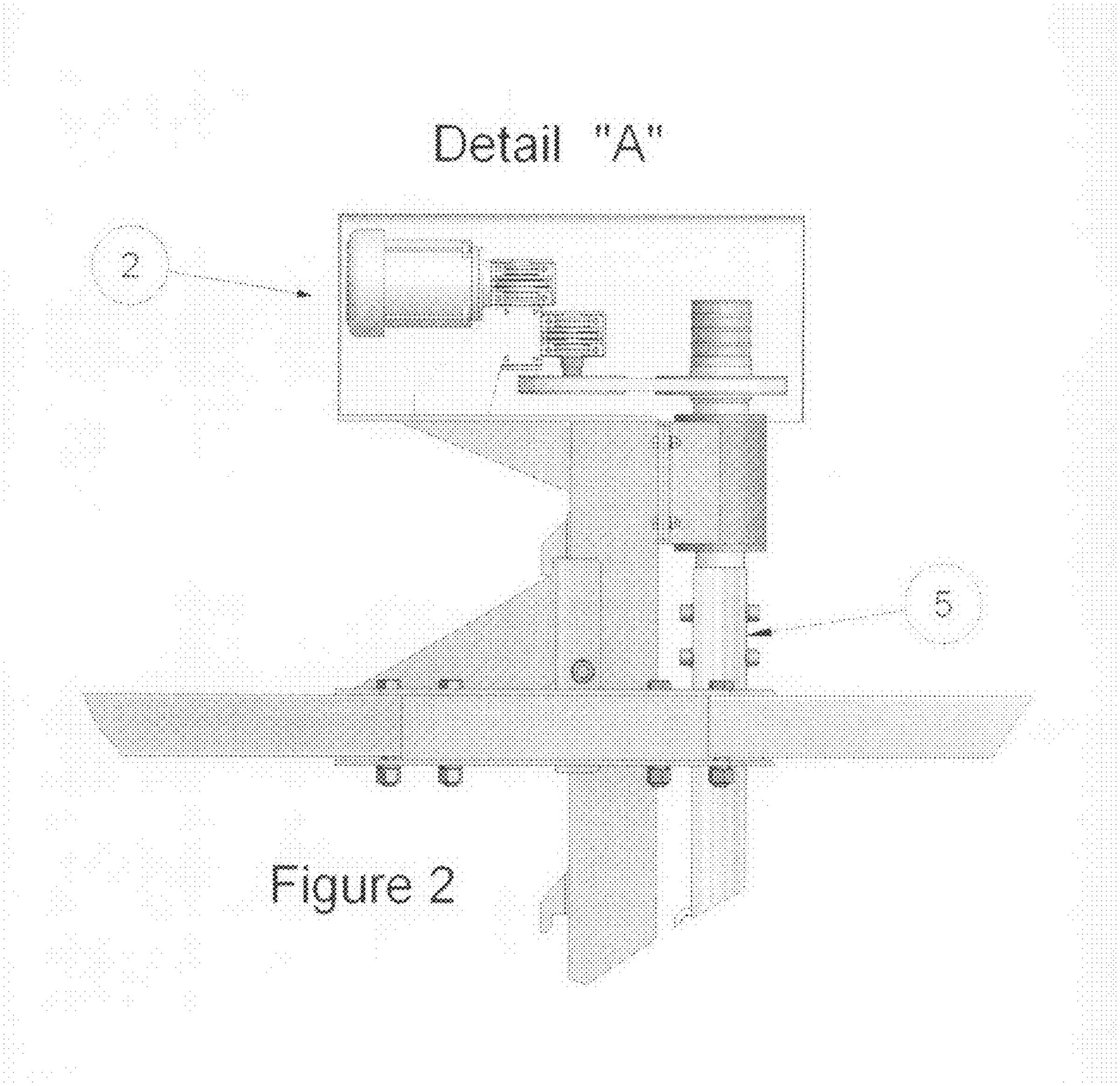
FIG. 2 represents detail A, presented in FIG. 1, where we observe the motoreducer assembly 2 and the vertical shaft 5.
Figure 3:
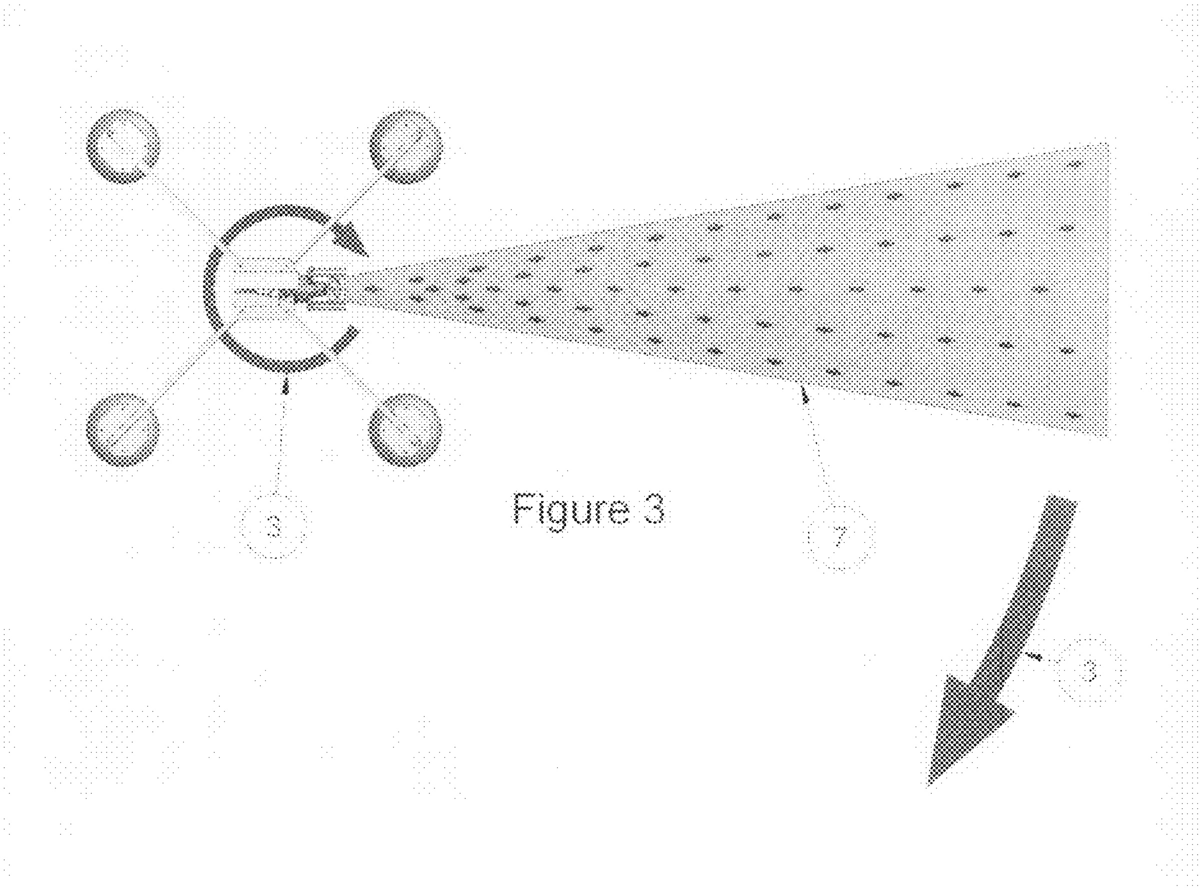
FIG. 3 is a top view of the submerged pump 1 with the motoreducer assembly 2, indicating the orientation of rotation 3 and the conical current of liquid 7.
Figure 4:
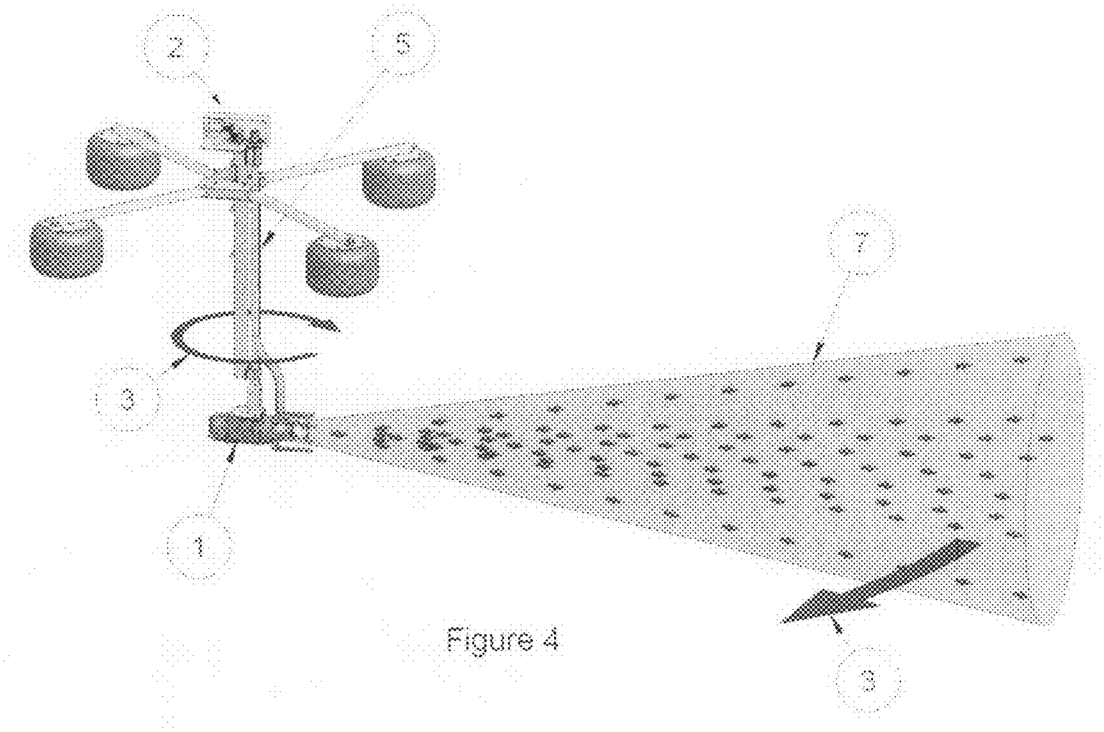
FIG. 4 is a perspective view of the submerged pump 1 with the motoreducer assembly 2, indicating the orientation of rotation 3.
Figure 5:
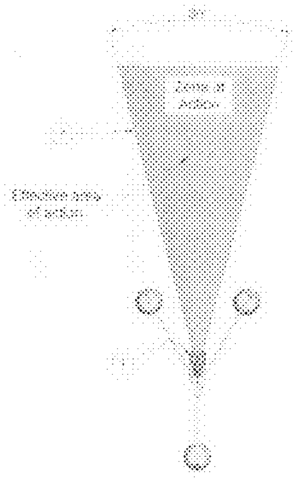
FIG. 5 is a top view of a submerged pump 1 with the conventional system, where in the conical current of liquid 7, we can observe the limited effective area of action.
Figure 6:
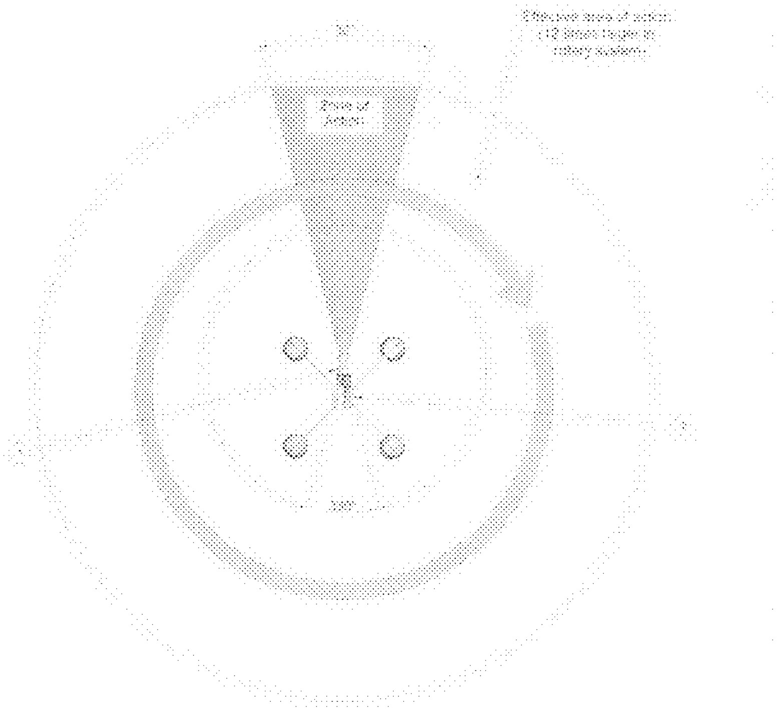
FIG. 6 is a top view of the submerged pump 1 with the motoreducer assembly 2, indicating the effective area of action, represented by the rotation of the conical current of liquid 7.

The rotation of the vertical shaft 5 displaces gradually the conical current of liquid 7 generated by the propeller of the submerged pump 1, as it can be seen in a comparison between FIGS. 5 and 6. The present invention permits the maximization of the conical current of liquid 7 of the oxygenation/mixture flow, which will act in all directions, reducing the number of aerators and the final consumed power.

The conical current of liquid 7 is maximized due the rotation of the is submerged pump 1, aerating its entire vicinity and mixing the aerated with non-aerated water.

With this 360° rotation that will be carried out by the vertical shaft 5 moving together with the submerged pump 1, the entire area around the system will be completely aerated/mixed.

As it can be observed in FIG. 6, the area of action is 12 times larger in the rotary system for submerged pump 1 in relation to the conventional system. An area using the rotary system for submerged pump 1 will use approximately one hour to generate a complete rotation)(360° of the submerged pump 1 that will cover an area within an estimated radius of action of 30 m. The process of the rotary system for submerged pump 1, besides eliminating the number of application points of the conventional systems, eliminates the so-called dead zones (non-aerated or mixed zones), this way there is an improved efficiency and quality.

It must be evident to the experts of the technique that the present invention can be configured from many other specific ways without moving away from the spirit or scope of the invention. Especially, it must be understood that the invention can be configured in the described ways.

The invention claimed is:

1. A submerged pump including a rotary system comprising:

a flotation assembly structured to float on a body of water;

a vertical shaft having an upper end and a lower end, said upper end being disposed above the flotation assembly and said lower end disposed below the flotation assembly, in a submerged position;

a submerged pump, including an electric motor and a propeller, said submerged pump connected to the lower end of the vertical shaft, such that a longitudinal axis of the submerged pump is orthogonal to the vertical shaft;

a motoreducer assembly, including a drive motor, said motoreducer assembly connected to the upper end of the vertical shaft;

wherein the submerged pump produces a conical current of liquid in a position substantially horizontal or oblique and wherein the motoreducer assembly produces a rotation of the vertical shaft, consequently, the submerged pump and the conical current of liquid are rotated about the vertical shaft.

2. A submerged pump as defined in claim 1, and including a transmission system, including pulleys, wherein the upper end of said vertical shaft is coupled to said motoreducer assembly through said transmission system.

* * * * *